T. H. BAILEY.
VALVE FOR WATER CYLINDERS, &c.
No. 41,471. Patented Feb. 9, 1864.
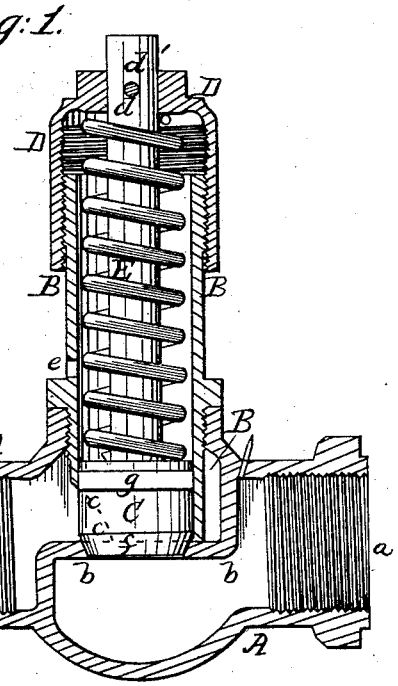
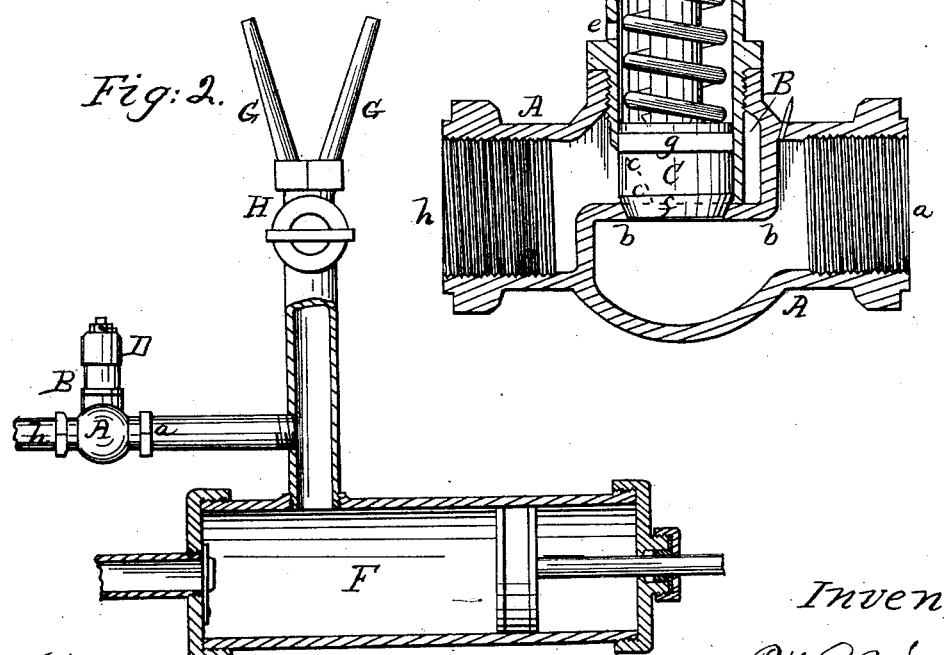
Witnesses.
J W Coombs
Geo Reed
Inventor.
T H Bailey
per Munn & Co
Attorneys

UNITED STATES PATENT OFFICE.

THOMAS H. BAILEY, OF TROY, NEW YORK.

IMPROVEMENT IN RELIEF-VALVES FOR WATER-CYLINDERS.

Specification forming part of Letters Patent No. 41,471, dated February 9, 1864.

*To all whom it may concern:*

Be it known that I, THOMAS H. BAILEY, of Troy, in the county of Rensselaer and State of New York, have invented a new and Improved Valve for the Water-Cylinders of Steam Fire-Engines and other Pump-Cylinders; and I do hereby declare that the following is a full, clear, and exact description of the same, reference being had to the accompanying drawings, forming part of this specification, in which—

Figure 1 is a central vertical sectional view of the valve, full size. Fig. 2 is a central vertical sectional view on a smaller scale, showing the attachment of the valve to a pump-cylinder.

Similar letters of reference indicate corresponding parts in both figures.

To enable others to make and apply my invention, I will proceed to describe its construction and operation.

A is a casing, like that of an ordinary globe-valve, attached by a screw-thread, a, to a suitable opening provided in the pump-cylinder F between the said cylinder and the hose or pipe connections.

B is a hollow cylinder screwed into the top of the said casing, and coming to a bearing on the top of the casing and into contact with a surface surrounding the valve-seat b, but having an opening, c, at the bottom toward the outlet-opening of the casing.

C is the valve, having a conical face, f, ground to fit the seat b, and having its upper part made in the form of a piston and packed with leather or other soft material, g, to fit water-tight within the cylinder B. This valve has a stem, d, which fits to an opening in an adjustable screw-cap, D, which is screwed onto the top of the cylinder B.

E is a spiral spring surrounding the valve-stem between the top of the valve and the crown of the screw-cap D, and adjusted by screwing down the said cap to make it produce a greater or less pressure upon the upper side of the valve, that a greater or less pressure may be required upon its under side to open it. e is a vent-hole in the cylinder B, above the valve, to provide for the escape from the said cylinder of any water that may pass above the valve.

G G, Fig. 2, are two hose or pipe connections, one of which may be closed by the single cock H, leaving the other open. Separate cocks may be used for the two pipe-connections.

The spring E is intended to be so adjusted that when the hose or pipe connections are both or all open it will exert pressure enough upon the valve to keep it closed, but that when one of the said connections is closed the extra pressure upon pump and hose or pipe, acting upon the lower surface of the valve, may raise it and provide for a suitable escape of water through the outlet h of the casing A, and so relieve the pump and hose or pipes. The construction of the upper part of the valve to fit the cylinder B, like a piston, is intended to prevent any accumulation of water within the said cylinder above the valve, which would interfere with the free opening of the valve; and in case of any water passing the piston by reason of defective packing, it will escape by the vent e.

To enable the valve to be screwed down to bring all practical pressure upon the pump and hose in a trial of an engine, there is a hole, d', drilled through the upper part of the screw-cap D and valve-stem d, when the valve is down in its seat for the reception of a pin by the insertion of which the valve-stem and cap can be connected rigidly, so that by slightly turning the cap the valve may be screwed down close to its seat.

I do not claim, broadly, the invention or use of spring pistons or valves; but

What I claim as my invention, and desire to secure by Letters Patent, is—

The combination of the valve C, stem d, spring E, adjustable cap D, and pin hole d', whereby the valve may be either held upon its seat with a variable yielding pressure or may be elevated therefrom or held immovably thereon as an ordinary screw-plug.

THOMAS H. BAILEY.

Witnesses:
MARTIN MILLIGAN,
WM. ARCHBOLD.